United States Patent [19]

Sakaki et al.

[11] Patent Number: 4,783,376

[45] Date of Patent: Nov. 8, 1988

[54] LIGHT-TRANSMISSIVE RECORDING MEDIUM AND IMAGE FORMATION METHOD USING THE SAME

[75] Inventors: Mamoru Sakaki; Ryuichi Arai, both of Sagamihara; Kenji Hasegawa, Isehara; Takahiro Mori, Ebina; Takashi Akiya, Yokohama; Hidemasa Mouri, Yokohama; Michiaki Tobita, Yokohama; Masahiko Ishida, Fujisawa, all of Japan

[73] Assignee: Canon Kabushiki Kaisha, Tokyo, Japan

[21] Appl. No.: 942,726

[22] Filed: Dec. 17, 1986

[30] Foreign Application Priority Data

Dec. 18, 1985 [JP] Japan .................................. 60-285284
Apr. 3, 1986 [JP] Japan .................................. 61-75457

[51] Int. Cl.⁴ .......................... G01D 15/34; B32B 5/16

[52] U.S. Cl. .................................... 428/511; 428/211; 428/68; 428/512; 428/513; 428/514; 428/537.1; 346/135.1; 427/121

[58] Field of Search ..................... 162/138; 346/135.1; 427/121; 428/211, 511-514, 537, 68

[56] References Cited

U.S. PATENT DOCUMENTS

| | | | |
|---|---|---|---|
| 4,264,193 | 4/1981 | Oonishi et al. | 355/32 |
| 4,298,652 | 11/1981 | Suzuki et al. | 428/323 |
| 4,370,379 | 1/1983 | Kato et al. | 428/341 |
| 4,521,785 | 6/1985 | Matsufugi | 346/134 |
| 4,550,053 | 10/1985 | Arai et al. | 428/304.4 |
| 4,636,805 | 1/1987 | Toganoh et al. | 346/1.1 |
| 4,642,247 | 2/1987 | Mouri et al. | 427/214 |
| 4,686,118 | 8/1987 | Arai et al. | 427/264 |
| 4,701,837 | 10/1987 | Sakaki et al. | 346/135.1 |

*Primary Examiner*—John E. Kittle
*Assistant Examiner*—P. J. Ryon
*Attorney, Agent, or Firm*—Fitzpatrick, Cella, Harper & Scinto

[57] ABSTRACT

A light-transmissive recording medium comprises a coating layer which has a surface electric resistance not more than $10^{14}$ $\Omega/cm^2$, and has property of trapping a recording agent which is soluble and/or dispersible in an aqueous medium.

30 Claims, No Drawings

LIGHT-TRANSMISSIVE RECORDING MEDIUM AND IMAGE FORMATION METHOD USING THE SAME

BACKGROUND OF THE INVENTION

1. Field of the Invention

The present invention relates to a recording medium capable of providing a recorded image with an excellent light transmittance in a method of image formation using an electrostatic recording system. More particularly, the present invention concerns a recording medium which provides a high-quality clear image in methods of image formation using recording tools such as felt-tip pens, fluorescent markers, and fountain pens employing a water-based medium, as well as a recording apparatus such as a pen plotter or an ink-jet recording system.

In addition, the present invention concerns a recording medium which provides a high-quality image in a thermal transfer recording system or an impact-type recording system.

2. Description of the Related Art

A method of image formation by an electrostatic recording system is a system whereby, using various methods, an image is formed by selectively imparting a charge to the surface of a recording medium and by causing a particulate recording agent (toner) to adhere to the charged portions thereof. This method is employed in copying machines, facsimile apparatuses, and the like. In particular, copying machines of an electrophotographic system using an electrostatic process have been used widely.

The method of image formation based on the electrostatic recording system comprises a process of forming an image on a recording medium by means of charges and a process of thermally fixing an adhered recording agent. As properties required of a recording medium suitable for the electrophotographic system, for example, it is possible to cite electrical conductivity, smoothness, whiteness, gloss, lack of curling, uniform quality, and so forth. Among these items, the electrical characteristics of the surface of the recording medium are particularly important. For this reason, a recording medium for electrophotography is generally processed to give it a suitable surface resistance.

In addition, there is also strong demand for a recording medium which transmits light and can be used in an optical apparatus (e.g., an overhead projector) to observe a transmitted image. Such a recording medium must have an outstanding degree of light transmittance in addition to the aforementioned property requirements.

As recording media for the above-mentioned application, light-transmissive sheets, such as plastic films whose surfaces have been processed for electric conductivity, are generally used. In this case, however, the recording medium itself, including its surfaces, must have a sufficient heat resistance, in addition to the aforementioned requirements.

Furthermore, there is also strong demand for color images in applications such as those described above.

In order to form a color image on a light-transmissive sheet, a method of silver-halide photographic printing or electrophotography has hitherto been used, but, in both cases, a large-scale apparatus is required.

As the most simple method of forming a color image, it is possible to cite a directly coloring method by socalled water-based ink pens, using the water-based ink of felt-tip pens, fluorescent markers, fountain pens, or the like, or a method based on a pen plotter making use of such pens. In this case, the light-transmissive material is required to enable the recording agent contained in the ink to be fixed promptly thereon.

As another method of forming a color image, it is also possible to cite one using a printer or plotter making use of a color hard-copy machine, a wire dot method, an ink jet method, a thermosensitive recording method, or the like.

In this case, the light-transmissive recording material is required to exhibit the properties given below.

For instance, in the case of the ink-jet recording system using water-based ink, speedy fixing characteristics of the recording agent of the ink are required, in the same way as with water-based ink pens, while, in the case of the thermal transfer recording system, smoothness and heat resistant characteristics are particularly important.

As described above, requirements concerning the properties of recording media vary, and a light-transmissive recording medium which can be used in all of the aforementioned recording systems (those using a copying machine of the electrophotographic system, water-based ink pens, the ink-jet recording system, the wire dot printing system, or the thermal transfer recording system) has not yet been found.

For example, the overhead projector (OHP) film for electrophotography disclosed in U.S. Pat. No. 4,370,379 is arranged such that an subbing layer having a surface resistance of $1.0\times10^6$ to $9.0\times10^9\Omega$ is provided on a plastic film, and a toner-receiving layer having a surface resistance of $1.0\times10^{10}$ to $1.0\times10^{13}\Omega$ is further provided thereon.

Although this film has sufficient heat resistance and surface conductivity, the surface of the film per se is nonporous, so that, if coloring is effected on an image obtained by an electrophotographic copying machine, using a felt-tip pen, a fluorescent marker, a fountain pen, or the like, an aqueous component remains on the surface, and drying is therefore delayed. Consequently, there is a drawback in that the image may be impaired if something comes into contact with its surface after recording.

SUMMARY OF THE INVENTION

A primary object of the present invention is to provide a light-transmissive recording medium which can be advantageously used in the aforementioned electrostatic recording system, which has an excellent light transmittance, in particular, and which allows a clear high-quality image to be obtained thereupon when applied to optical equipment.

Another object of the present invention is to provide a light-transmissive recording medium which allows an image to be formed by means of a felt-tip pen, a fluorescent marker, a fountain pen, or other recording tool as well as other recording apparatuses and which allows a clear, high-quality color image to be obtained thereon.

A further object of the present invention is to provide a light-transmissive recording medium which allows a high-quality image to be obtained thereon in the impact-type recording system as well.

A still further object of the present invention is to provide a novel method of image formation which allows a high-quality light-transmissive image to be obtained by the use of any of an electrostatic recording system, a recording system using water-based media, and a thermosensitive recording system.

To this end, the present invention provides, in accordance with one aspect of the invention, a light-transmissive recording medium, comprising a coating layer which has a surface electric resistance not more than $10^{14}\Omega/cm^2$, and has trapping a property of trapping a recording agent is soluble and/or dispersible in a water-based medium.

In accordance with another aspect of the invention, the present invention provides a light-transmissive recording medium, comprising a coating layer which has a surface electric resistance not more than $10^{14}\Omega/cm^2$, and has water resistance and a property of trapping a recording agent which is soluble and/or dispersible in a water-based medium even under a wet condition.

In accordance with a further aspect of the invention, the present invention provides a method of image formation, characterized in that image formation is effected on a light-transmissive recording medium having a coating layer which has a surface electric resistance not more than $10^{14}\Omega/cm^2$, and has a property of trapping a recording agent which is soluble and/or dispersible in a water-based medium, using any of recording systems including an electrostatic recording system, a recording system using a waterbased ink pen, a thermal transfer recording system, and an ink-jet recording system.

DETAILED DESCRIPTION OF THE PREFERRED EMBODIMENTS

With respect to the light-transmissive recording medium of the present invention, it is essential to adjust the value of the surface electric resistance to $10^{14}\Omega/cm^2$ or less, preferably to the range of $10^8$ to $10^{14}\Omega/cm^2$, and more preferably to $10^{10}$ to $10^{14}\Omega/cm^2$ for the purpose of obviating such inconvenience, in electrostatic recording, of high surface electric resistance at a low humidity conditions causing fogging of image by frictional electrical charging.

The "trapping property" referred to herein means the property by which, if filter paper is pressed against the surface of a recording medium on which recording has been effected with a recording liquid, after a fixed time (generally at least 5 seconds) has elapsed after effecting recording on the recording medium by means of the recording liquid, a recording agent in the recording liquid is trapped by the recording medium to such a degree that the recording agent does not stick to the filter paper.

In the present invention, it is essential for the recording medium to have a nonporous surface so as to be light transmissive, so that it is necessary for the recording medium to be constituted by certain specific materials.

With a material such as paper which has a porous surface, the recording agent of a water-based system is absorbed by capillarity and the recording agent is also trapped. In the case of a nonporous material, however, the following forms can be cited as examples of constituent material for the recording medium:

(I) In one form, the constituent material may be one that contains a material which electrically adsorbs particles of a recording agent or which is reactive to the molecules of the recording agent and produces such bonding as ionic bonding, hydrogen bonding, covalent bonding, and the like.

To cite a specific example, this type of recording material may be one that contains a cationic resin with respect to acidic dye when water soluble dye is used as the recording medium.

(II) In another form, the constituent material may be one that contains a material which has lubricating properties or solubility with respect to the medium of a recording agent and which traps the recording agent in the recording medium.

To cite a specific example, this type of recording medium may be one that contains water soluble or hydrophilic polymers if a water-based recording liquid using water soluble dye is used.

The recording medium of the present invention thus arranged is capable of forming an image even when applied to a recording system using a water-based medium, and the so formed image would not be impaired should an object or finger be brought into contact with the recorded surface after recording.

Furthermore, according to the views of the present inventors, the case where the recording medium has water-based medium-absorbing properties is preferable in order to obtain a clearer recording image. Therefore, the form described in (II) above is more suitable.

A second feature of the present invention is that the recording medium has a surface displaying a heat softening temperature of 100° C. or above, or perferably 120° C. or above, or more preferably 140° C. or above. Accordingly, the material constituting the recording medium of the present invention is selected from materials whbse heat softening temperature falls within the aforementioned ranges.

Specifically, as examples of materials having the aforementioned range of heat softening temperature, it is possible to cite polyvinyl alcohol and acrylic polymers. Among these materials, the recording material is preferably constituted, as occasion demands, by polyvinyl alcohol which swells or is soluble in a water-based medium or by acrylic polymers obtained by copolymerizing hydrophobic and hydrophilic monomers.

The recording medium of the present invention having the aforementioned characteristic features provides a clear high-quality light-transmissive image even when recording is effected by, for example, the electrophotographic system. If the heat softening temperature is 100° C. or below, the recorded surface becomes undesirably cloudy, so that an image having sufficient light-transmitting properties cannot be obtained.

The heat softening temperature referred to herein means the temperature at which, upon heating, the surface resistance of the recording medium against any external stress is below a fixed value. In particular, the present inventors found that a correlation exists between any decline in the scratch resistance of the recording surface induced by heating and its suitability for electrostatic recording by a recording apparatus having a.heating and fixing mechanism.

Therefore, the heat softening temperature referred to herein means the temperature at which the scratch resistance of the recording surface drops to a fixed level or below, and, in the present invention, it is the temperature at which scratch resistance based on a pencil lead scratching test as specified in JIS K-5400 shows a level of F or below.

In the present invention, the scratch test was conducted under a 50 g load, and judgment as to the scratch resistance was made on the basis of the presence or absence of damage or rupture of the surfaces.

The aforementioned objects of the present invention are attained by the above-described arrangement; however, description of more preferable embodiments of the present invention will be made below to allow more effective application of the present invention.

The recording medium of the present invention should preferably be a light-transmissive recording medium which comprises a substrate and a coating layer provided on the substrate and having a surface whose heat softening temperature is substantially 100° C. or above, and which has properties capable of trapping a recording agent soluble and/or dispersible in a water-based medium. More preferably, the coating layer should be water resistant.

As for the substrate for the coating layer in the present invention, any suitable substrate which has a heat resistance of 100° C. or above and is light transmissive may be used.

As suitable examples, mention may be made of a film or plate of a polyester resin, a polysulfone resin, a diacetate resin, a triacetate resin, an acrylic resin, a polycarbonate resin, a polychloride vinyl resin, a polyimide resin, or similar resins.

The thickness of such a substrate is preferably in the range of 1-5,000 mm generally.

Water resistance referred to herein means water resistance in practical use, and is such that the coating layer, when immersed in still water for one minute, is not dissolved.

In other words, unless the coating layer is water resistant, if a drop of water is adhered to its surface under high humidity, the surface of the recording medium assumes tackiness. Consequently, if such a recording medium is used in a copying machine of the electrophotographic system, troubles can occur such as overlapped feeding and adhesion of the recording medium in the conveying system of the apparatus.

Furthermore, if recording is effected using an water-based recording liquid, the strength of a recorded portion becomes weak, so that certain problems occur such as blocking in the recording section and the surface of the recording medium becoming damaged when recording is effected directly on the surface of the recording medium using recording tools.

The aforementioned recording instruments, such as felt-tip pens, fluorescent markers, fountain pens, etc. contain in their recording media pH adjusting agents and the like to ensure stability and color formation of the recording agents, their pH normally being in the range of 4–10. Accordingly, for the aforementioned reason, it is desirable that the recording media of the present invention possess substantial water resistance in the range of pH=4–10.

Specifically, an embodiment of a coating layer being water resistant and having recording agent-trapping properties is one which, in terms of the aforementioned types (I) and (II), is water-resistant and is capable of swelling and/or dissolving in the water-based recording liquid.

As specific examples of coating layers such as those described above, it is possible to cite the following:

(a) One obtained by blending hydrophobic polymers with hydrophilic polymers (b) One which has within its particles hydrophobic segments and hydrophilic segments, and in which the polymers themselves are water resistant and hydrophilic (c) One obtained by crosslinking water soluble polymers using a known crosslinking agent to suppress excessive hydrophilic properties (d) One obtained by blending different types of water soluble polymer that exhibit a weak degree of bonding between each other and become water resistant during blending.

In the present invention, the fastness to rubbing in accordance with JIS-L-0853 when a drop of water falls on the surface of the coating layer should preferably be Class 2 or higher.

In cases where a recording instrument for recording directly on the surface of the recording medium, such as felt-tip pens, fluorescent markers, fountain pens, etc., is used, the surface on which a water-based recording agent is impressed is unable to retain its shape at the time of contact if the fastness to rubbing is less than 2. Hence, certain problems can arise such as the likelihood of damage of the image and the like.

In its more preferable form, the recording medium of the present invention having the aforementioned arrangement should contain a compound in which the coating layer has crosslinking properties (crosslinking polymers) and a cationic modified product of polyvinyl alcohol (PVA).

The cationic modified product of PVA which characterizes the present invention is represented by a PVA which has in its main or side chains cationic groups such as primary to tertiary amino groups, quaternary ammonium bases, etc.

In general, the PVA is obtained by subjecting polyvinyl acetate to an acid or alkali saponification process. However, the cationic modified product of PVA which is used in the present invention and characterizes the same is obtained by copolymerizing vinyl acetate with:

one or more kinds of vinyl monomers containing quaternary ammonium slats (or precursor groups, i.e., primary to tertiary amino groups) including vinyloxyethyltrimethylammonium chloride, 2,3-dimethyl-1-vinylimidazolinium chloride, trimethyl-(3-acrylamido-3,3-dimethylpropyl)ammonium chloride, trimethyl-(3-methacrylamidopropyl)ammonium chloride, N-(1,1-dimethyl-3-dimethylaminopropyl)-acrylamide, N-(3-dimethylaminopropyl)methacrylamide, trimethyl(3-acrylamide)ammonium chloride, 1-vinyl-2-methyl(or ethyl, phenyl)imidazole, and 1-vinyl-2,4,5-trimethylimidazole; or other nitrogen heterocyclic vinyl compounds, or vinyl compound monomers that are readily capable of being transformed into cationic groups, such as nitroderivatives thereof, including o-, m-, or p-aminostyerne, monoalkyl or dialkyl derivatives thereof, or quaternary ammonium salts thereof;

o-, m-, or p-vinylbenzylamine, monoalkyl or dialkyl derivatives thereof, or quaternary ammonium salts thereof;

N-(vinylbenzyl)pyrrolidine;

N-(vinylbenzyl)piperidine;

N-vinylpyrrolidone;

α- or β-vinylpyridine or quaternary ammonium salts thereof;

α- or β-piperidine or quaternary ammonium salts thereof; and 2- or 4-vinylquinoline or quaternary ammonium salts thereof, and by subjecting the copolymers thus obtained to saponification by a conventional method.

In addition, cationic modification of PVA may be effected by copolymerizing in advance vinyl acetate and monomers having other reactive groups, and by, after saponification, subjecting cationic group-containing compounds to reaction by making use of such reactive groups. Furthermore, cationic modification of PVA may be effected directly by making use of the hydrogen groups in the PVA and by using a compound which is capable of simultaneously having primary to tertiary amino groups or quaternary ammonium groups and groups capable of reacting with those hydrogen groups, e.g., glycidyltrimethylammonium chloride.

As for the amount of cationic groups present in such cationic modified product of PVA, when expressed in terms of the molar fraction in units of monomers in polymers, a range in which cationic groups account for 2-20 mol % of the total monomer units is preferable. If the amount of cationic modified groups becomes less than 2 mol %, as compared with non-modified PVA, sufficient effect cannot be obtained with respect to the dye-absorbing properties of the coating layer, water resistance of the image, resolution, physical properties in ink-jet recording such as color development, and stability of an image during storage under high humidity. On the other hand, an amount exceeding 20 mol % is not desirable since the adhesion and filmforming properties of the coating layer with respect to the substrate would deteriorate. The degree of saponification of PVA, which is the backbone polymer, should be selected in consideration of the particular application of the recording medium, but, generally speaking, it is preferable to employ one in an amount in the range of approximately 70-93 mol %. In addition, the degree of polymerization of the cationic modified product of PVA should preferably be in the range of 500-5,000, more preferably 800-3,000. Furthermore, in the respective materials, it is possible after mixing to use those cationic modified products that differ in degree of polymerization and saponification.

Moreover, the recording medium of the present invention is characterized in that the coating layer contains a compound having crosslinking properties.

Such a compound having crosslinking properties is one that is capable of crosslinking with a cationic modified product of PVA. As suitable examples of such compounds, it is possible to cite aldehyde compounds, carboxyl compounds, activated vinyl compounds, multivalent metal-containing compounds, methylol compounds, acidic anhydrides, etc. As for the recording medium of the present invention, it is desirable and effective for the coating layer to contain an isocyanate compound and/or water soluble melamine resin.

A particularly suitable isocyanate compound is hydrophilic polyurethane resin which is obtained by reaction between an isocyanate compound and polyether polyol or polyester polyol and which has an isocyanate group at the end thereof. A suitable water soluble melamine resin is methylol melamine, particularly methylated methylol melamine resin. Such a resin can be produced by an industrially known method.

A cationic modified product of PVA for use in the recording medium of the present invention is a water soluble polymer and a coating layer formed by a cationic modified product of PVA alone is therefore substantially water soluble. Consequently, the surface of the coating layer becomes tacky when a drop of water falls onto its surface or when it is left under the conditions of high humidity, with the result that certain troubles occur such as blocking when the recording media are stacked in a pile, trouble due to adhesion of the recording apparatus on the conveying system, or multiple feeding at the time when a pile of recording media is being fed.

In a more preferable form of the present invention, the coating layer of the recording medium is constituted by a cationic modified product of PVA in which excessive hydrophilic properties are checked by a known method, and which is crosslinked so as to possess adequate hydrophobic properties (i.e., water resistance), thereby preventing such troubles as those described above.

In the aforementioned form as well, the mixing ratio at which the cationic modified product of PVA and crosslinking compound are mixed together varies depending on the type of crosslinking compound employed. However, the weight ratio in the order of 100/1-2/1 (cationic modified product of PVA/crosslinking compound) is suitable. In other words, if the crosslinking compound is less than 100/1 of the cationic modified product of PVA, a less effect is produced than in a case where the crosslinking compound is not used. On the other hand, if it is 2/1 or more, the hydrophilic property of the coating layer formed drops, so that the water-based inkabsorbing property disappears, and it is therefore unpreferable in the case of a recording system using water-based ink, such as the water-based ink pen system, the pen plotter system, and theink-jet system.

If crosslinking of the cationic modified product of PVA proceeds, the water resistance, heat resistance, and surface hardness of the coating layer becomes more excellent, but lowering of the aqueous ink-absorbing property occurs. However, according to the present inventors' views, if a hydrophilic isocyanate compound and/or water soluble melamine resin are used as a crosslinking compound, the lowering of the water-based ink-accepting property is less even if crosslinking progresses. Therefore, a particularly effective form in accordance with the present invention is one in which the coating layer is constituted by a hydrophilic isocyanate compound and/or a cationic modified product of PVA crosslinked by water soluble melamine resin.

Furthermore, a suitable form of the present invention is one in which the coating layer has two or more kinds of crosslinking compounds. According to the present inventors' conjecture, this is attributable to the fact that, if the coating layer has two or more kinds of compounds, reaction between the crosslinking compounds themselves also takes place in addition to the crosslinking reaction between the crosslinking compounds and the cationic modified product of PVA, and that, although the ratio between the two types of reaction is not clear, the coating layer formed possesses an appropriate water resistance and retains affinity with ink.

In the above-described embodiment as well, a mixing ratio of the cationic modified product of PVA to the crosslinking compounds (aggregate) is preferably in the range of 100/1-2/1 by weight or thereabout. The mixing ratio of the crosslinking compounds jointly used should be within an extent in which one kind of compound does not exceed 90 wt% of the total. If the ratio falls outside that range, a sufficient effect cannot be obtained as compared with a case where a single compound is used.

In the aforementioned method, as suitable examples of other polymers that can be used by being mixed with a cationic modified product of PVA, it is possible to cite natural resins such as albumin, gelatin, casein, starch, cationic starch, gum arabic, and sodium alginate, as well as synthetic resins such as polyamide, polyacrylamide, polyvinyl pyrrolidone, quaternary polyvinyl pyrrolidone, polyethylene-imine, polyvinylpyridinium halide, a melamine resin, polyurethane, carboxymethylcellulose, polyvinyl alcohol, a polyester, polysodium acrylate, SBR latex, NBR latex, polyvinyl formal, polymethyl methacrylate, polyvinyl butyral, polyacrylonitrile, polyvinyl chloride, polyvinyl acetate, a phenol resin, an alkyd resin, and an epoxy resin. One or more than one of these materials may be used, as desired. If such light-transmissive polymers are used in combination with the aforementioned cationic modified product of PVA, the cationic modified product of PVA and other polymers, in terms of the weight ratio, are used in the range of 20:1 to 1:20, or preferably 15:1 to 1:10.

Furthermore, in the aforementioned method, in order to further improve the anti-blocking properties of the coating layer, it is possible to disperse in the coating layer fillers such as silica, clay, talc, diatomaceous earth, calcium carbonate, calcium sulfate, barium sulfate, aluminium silicate, synthetic zeolite, alumina, zinc oxide, lithopone, and satin white to an extent not to impair the light transmittance of the recording medium.

The recording medium of the present invention is formed by using the aforementioned major materials. Since this recording material excels particularly in light transmittance, it may be used mainly for an OHP or the like for projecting a recorded image onto a screen or the like using an optical apparatus and is therefore useful as a recording medium for forming light-transmissive images for observation.

Such a light-transmissive recording medium can be prepared by forming, on a light-transm:issive substrate such as described above a light-transmissive coating layer using a mixture of a cationic modified product of PVA and other light-transmissive polymers, or preferably polymers with a crosslinking compound added thereto.

As for a method of forming such a coating layer, the following method should preferably be taken: A coating solution is prepared by dissolving or dispersing in a suitable solvent an cationic modified product of PVA described above, or a mixture of the same and other polymers with a crosslinking compound added thereto. The coating liquid is applied on a light-transmissive substrate using a known method such as a roll coating method, a rod bar coating method, a spray coating method, and an air-knife coating method, and is let to dry immediately thereafter. It is also possible to employ other methods including one whereby the independent cationic modified product of PVA, or a mixture of the same and other polymers with a crosslinking compound added thereto is applied to a substrate by hot melt coating, or one whereby a sheet for a coating layer is separately formed using materials such as those described above, and the sheet is then laminated on the substrate.

In the above-described recording medium, the thickness of the coating layer formed on the substrate is normally in the range of 1 to 200 μm or thereabout, or preferably 5 to 100 μm or thereabout.

A recording medium formed as described above is a light-transmissive recording medium having sufficient light transmittance.

The sufficient light transmittance referred to herein means that the linear light transmittance of the recording medium is at least 2 %, and the linear light transmittance should preferably be 10 % or above.

If the linear light transmittance is 2 % or above, a recording image can be projected onto a screen using, for instance, an OHP and can be observed. In order for the details of the recording image to be observed clearly, the linear transmittance should preferably be 10 % or above.

The linear light transmittance (T) referred to herein is a value obtained in the following procedure: A beam of light is made incident perpendicularly into a sample. The beam of light is transmitted through the sample and passes through a light receiving-side slit on an extention of the optical path of the light. A spectral transmittance of a linear beam of light received by a detector is measured by using, for example, the Model 323 Hitachi Automatic Recording Spectrophotometer, and the value Y of tristimulus values of color is then found from the measured spectral transmittance, and the linear light transmittance (T) is determined by the following formula:

$$T = Y/Y_0 \times 100 \quad \text{(I)}$$

Where

T: linear light transmittance

Y: value Y of the sample $Y_0$: blank value Y

Accordingly, the linear light transmittance referred to herein relates to a linear beam of light, and this evaluating method differs from a method of evaluating a light transmittance by means of diffused light on the basis of a diffused light transmittance (the transmittance of light including diffused light is determined by providing an integrating sphere in the rear of a sample) or on the basis of opacity (white and black linings are applied to the back of a sample and the light transmittance is determined from a ratio between the opacity of one lining and that of the other).

What becomes an issue in an apparatus employing optical technology is the behavior of linear beams of light, so that, in evaluating the light transmittance of recording media to be used in the equipment, the determination of linear light transmittance of the recording media is particularly important.

For instance, in the case of observing a projected image using an OHP, in order to obtain an image which gives a high contrast between a recorded portion and a non-recorded portion and which is clear and easy-to-view, the non-recorded portion in the projected image is required to be bright, i.e., the linear light transmittance of the recording medium to be at a fixed level or above. In a test using an OHP test chart, in order to obtain an image suitable for the aforementioned purpose, the linear light transmittance of the recording medium is required to be 2% or above, or preferably 10% or above so as to obtain a clearer image. Accordingly, as for a recording medium suitable for this purpose, its linear light transmittance should be 2% or above.

In the above, typical forms of the recording medium of the present invention have been described by way of example, but it goes without saying that the recording medium of the present invention should not be restricted to these forms alone. Incidentally, in respective forms, the coating layer may contain various known additives, such as a dispersant, a fluorescent dye, a pH adjuster, an anti-foaming agent, a lubricating agent, a fungicide, a surface active agent, and so forth.

It should be noted that the recording medium of the present invention may not necessarily be colorless, but may be colored.

In accordance with a method of a light-transmissive image formation of the present invention using the light-transmissive recording medium having the above-described constitution, it is possible to form a high-quality clear image on a recording medium with excellent light-transmittance and to provide a high-quality, clear projected image.

Furthermore, the light-transmissive recording medium having the above-described arrangement allows a high-quality, clear image to be formed in any of the recording systems of an electrophotographic recording system, water-based ink pen, a pen plotter system, a thermal transfer recording system, an ink-jet system, and the like. In accordance with a method of image formation of the present invention for effecting recording on the above-described recording medium by a recording system selected from the aforementioned group of systems, the formation of light-transmissive images can be effected at high speed, and precise and color images can be produced at low cost.

Moreover, since the above-described recording medium allows a high-quality clear image to be formed when applied to any of the aforementioned group of recording systems, it is possible to use the above group of recording systems in combination. For instance, precise color images can be formed at high speed and low cost using the image formation method of the present invention using the electrophotographic recording system and a water-based pen, in particular. Such a method of forming light-transmissive images has hitherto been unknown.

In addition, the method of image formation of the present invention allows light-transmissive images to be formed in a manner similar to that of paper and has no selectivity with respect to recording methods, so that there is no need to prepare special recording media for the respective recording systems. Thus, the image formation method of the present invention excels in terms of operational features and cost.

Hereinafter, detailed description of the present invention will be made in accordance with embodiments.

EXAMPLE 1

A 100 μm-thick polyethylene terephthalate film (made by Toray Industries, Inc.) was used as a light-transmissive substrate, and a coating liquid of the following composition was applied to the film by a bar coater method in such a manner that the film thickness after drying would become 5 μm. The sheet material thus prepared was dried for 10 minutes at 120° C., and a light-transmissive sheet material used in the present invention was thereby obtained.

Sheet Material 1:
(Surface electric resistance: $6.2 \times 10^{12}$ Ω/cm$^2$)
Composition of Coating Liquid:

| | |
|---|---|
| Cationic modified polyvinyl alcohol (C-318-2A, made by Kuraray Co., Ltd.), 10% aqueous solution | 100 wt. parts |
| Comb-type polymer* (made by Soken Kagaku K.K.) 25% methyl cellosolve solution | 2.5 wt. parts |

*20 wt. parts of MMA macromonomers are graft copolymerized onto 80 wt. parts of copolymers consisting of 56 wt. parts of backbone-chain n-methylolacrylamide and 24 wt. parts of diacetone acrylamide.

Incidentally, the surface electric resistance was measured by using YHP 4329A High Resistance Meter and YHP 16008A Resistivity Cell.

EXAMPLES 2-5

The polyester film used for th sheet material 1 was used as the light-transmissive substrate, and a coating liquid of the following composition was applied to this film by the bar coater method in such a manner that the thickness of the coating layer after drying would become 6 μm. The material thus prepared was dried by heat treatment for 10 minutes at 140° C., and a light-transmissive sheet material in accordance with the present invention was obtained.

Sheet Material 2:
(Surface electric resistance: $2.2 \times 10^{12}$ Ω/cm$^2$)
Composition of Coating Liquid:

| | |
|---|---|
| Cationic modified PVA (PVA-C-318-2A, made by Kuraray Co., Ltd.) 10% aqueous solution | 100 wt. parts |
| Isocyanate compound (Elastron C-9 made by Daiichi Kogyo Seiyaku Co., Ltd.) 10% aqueous solution | 7 wt. parts |
| Water soluble melamine resin (Sumimar M-50W made by Sumitomo Chemical Co., Ltd.) 10% aqueous solution | 15 wt. parts |

Sheet Material 3:
(Surface electric resistance: $1.7 \times 10^{12}$ Ω/cm$^2$)
Composition of Coating Liquid:

| | |
|---|---|
| Cationic modified PVA (PVA-C-318-2A, made by Kuraray Co., Ltd.) 10% aqueous solution | 50 wt. parts |
| Water soluble polyester polyurethane resin having an isocyanate group (Elastron E-37 made by Daiichi Kogyo Seiyaku Co., Ltd.) 25% aqueous solution | 2.5 wt. parts |
| Catalyst (Elastron Catalyst 32 made by Daiichi Kogyo Seiyaku Co., Ltd.) | 0.2 wt. parts |

Sheet Material 4:
(Surface electric resistance: $2.8 \times 10^{12}$ Ω/cm$^2$)
Composition of Coating Liquid:

| | |
|---|---|
| Cationic modified PVA (PVA-C-318-2A, made by Kuraray Co., Ltd.) 10% aqueous solution | 100 wt. parts |
| Isocyanate compound (Elastron C-9 made by Daiichi Kogyo Seiyaku Co., Ltd.) 10% aqueous solution | 20 wt. parts |
| Styrene/acrylic acid copolymer (Oxylac SH-2100 made by Nippon Shokubai Kagaku Kogyo Co., Ltd.) 10% aqueous solution | 10 wt. parts |

Sheet Material 5:
(Surface electric resistance: $3.5 \times 10^{12}$ Ω/cm$^2$)
Composition of Coating Liquid:

| | |
|---|---|
| Cationic modified PVA (PVA-C-318-2A, made by Kurary Co., Ltd.) 10% aqueous solution | 10 wt. parts |
| Water soluble melamine resin (Sumimar M-100, made by Sumitomo Chemical Co., Ltd.) 10% aqueous solution | 4 wt. parts |
| Styrene/acrylic copolymer (Oxylac SH-2100, made by Nippon Shokubai Kagaku Kogyo Co., Ltd) 10% aqueous solution | 2 wt. parts |

The recording media of the present invention thus obtained were transparent and colorless.

COMPARISON EXAMPLE 1 (SHEET MATERIAL 6)

A commercially available OHP film for a copying machine of the electrophotographic system (NP-Dry Transparency, made by Canon K.K.) was used as a sheet material for comparison. The surface electric resistance of this sheet material 6 was $3.0\times10^{13}\Omega/cm^2$.

COMPARISON EXAMPLE 2 (SHEET MATERIAL 7)

A commercially available polyester film (Lumilar, made by Toray Industries, Inc.) was used as a sheet material for comparison. The surface electric resistance of this sheet material 7 was $10^{15}\Omega/cm^2$.

As typical examples of a recording system for forming an image on the aforementioned light - transmissive sheet materials (1–7), recording by the following A–E recording systems was carried out.

(Recording System A)

As a typical example of the electrophotographic recording system, a copying machine (NP-500RE, made by Canon K.K.) was used and recording was carried out. Evaluations were then made on the adhesion of toner to the image formed, scraches on the surface of the sheet material, absence of cloudiness, scattering of toner, and absence of ghosts. An overall evaluation was made of projected images obtained, by marking one which excelled in all items with a circle, one which was inferior even in one item with a triangle, and one which was inferior in all items with a cross.

(Recording System B)

As a typical example of recording with a aqueous pen, recording was carried out using a fluorescent marker (COLORSTAR 366, made by STAEDTLER). Evaluations were then made on the ink-fixing properties and the present or absence of any change in the configuration of the surface of the coating layer. An overall evaluation was made of the projected images obtained, by marking one which excelled in both items with a circle, one which was inferior in either item, and one which was inferior in both items with a cross.

(Recording System C)

As a typical example of the pen plotter system, using a pen plotter (MY PLOT II MP-1000A, made by GRAPHTEC), recording was carried out with an attached water-based fiber pen, and an evaluation was made in a manner similar to that of the recording system B.

(Recording System D)

As a typical example of the ink-jet system, recording was carried out by using an on-demand type ink-jet printer (PT-1080A, made by Canon K.K.) which ejects ink by means of a piezoelectric vibrator using four-color water-based ink. Evaluations were then conducted of the presence or absence of flowing out of ink on the surfaces, ink-fixing properties, etc. An overall evaluation was made by marking one which excelled in all items with a circle, one which was inferior even in one item with a triangle, and one which was inferior in all items with a cross.

(Recording System E)

As a typical example of the thermal transfer recording system, recording was carried out by using a word processor (PW-10, made by Canon K.K.) using the thermal transfer recording system. Evaluations were then conducted of the transferability of ink onto the sheet materials, any change in the configuration of the surfaces of the sheet materials caused by heat, etc. An overall evaluation was made on the projected images obtained, by marking one which excelled in all items with a circle, one which was inferior even in one item with a triangle, and one which was inferior in all items with a cross.

Table I shows the results of evaluation of various samples using the recording systems A–E. Incidentally, the linear light transmittance, OHP suitability, recording agent-trapping property and writing property in Table I were based on the following evaluation.

Linear light transmittance (6) was measured by using Model 323 Hitachi Automatic Recording Spectrophotometer (made by Hitachi, Ltd.) spectral transmittance was measured by maintaining a distance of about 9 cm between samples and the window on the light-receiving side, and the linear light transmittance was obtained from the aforementioned formula (I).

OHP suitability (7) was measured using an OHP as a typical example of optical equipment. A recording image was projected on a screen using the OHP, and the OHP suitability was judged by visual observation. In the evaluation, a sample for which it was able to obtain a clear and easy-to-view projected image having a high OD (optical density) and a high contrast was marked with a circle, one in which a nonrecorded portion was slightly dark, the OD of the recorded image was slightly low, and lines with the pitch width of 0.5 mm and the bredth of 0.25 mm could not be clearly discriminated was marked with a triangle, and one in which the non-recorded image was fairly dark, the OD of the recorded image was fairly low, and lines with the pitch width of 1 mm and the breadth of 0.3 mm could not be clearly discriminated was marked with a cross.

As for recording agent-trapping properties (8), after conducting a recording test on sheet materials with a fluorescent marker at room temperature, filter paper was pressed against the surfaces of the sheet materials after a lapse of 5 minutes, and a case where filter paper was not colored was marked with a circle (having trapping property), and a case where filter paper was colored was marked with a cross (not having trapping property).

With respect to water resistance (9), after recorded images obtained in the recording formula C were immersed in still water for one minute, an overall evaluation was made with a circle and a cross by judging whether or not the traces of the recorded imaged could be discriminated and whether or not tack occurred by dissolution of part of the coating layer.

TABLE I

| | Examples | | | | | Comparison Examples | |
|---|---|---|---|---|---|---|---|
| | 1 | 2 | 3 | 4 | 5 | 1 | 2 |
| (1) Recording System A | o | o | o | o | o | o | x |
| (2) Recording System B | o | o | o | o | o | x | x |
| (3) Recording System C | o | o | o | o | o | x | x |
| (4) Recording System D | o | o | o | o | o | x | x |
| (5) Recording System E | o | o | o | o | o | o | Δ |
| (6) Linear Light transmission | 82% | 82% | 80% | 79% | 80% | 81% | 84% |
| (7) OHP suitability | o | o | o | o | o | o | o |
| (8) Recordiing agent-trapping | o | o | o | o | o | x | x |

TABLE I-continued

| | Examples | | | | | Comparison Examples | |
|---|---|---|---|---|---|---|---|
| | 1 | 2 | 3 | 4 | 5 | 1 | 2 |
| property (9) Water resistance | o | o | o | o | o | x | x |

As shown in Table I, in accordance with a method of a light-transmissive image formation of the present invention using sheet materials 1–5 as sheet materials and recording systems A–E, clear and high-quality images were obtained in respective cases. However, in cases where the sheet material 6 for comparison was used in the recording systems B–D, the aqueous ink remained in the sheet material for a long time, and ink flowed out on the surfaces. Moreover, even after a lapse of one day, the ink failed to be fixed, and the images were impaired when a finger was brought into contact with the recorded portions, with the result that clear light-transmissive images could not be obtained. When the sheet material was used in the recording system E, the ink failed to transfer sufficiently from an ink ribbon onto the sheet material, and high-quality clear images could not be obtained.

With the sheet materials 1–5, it was possible to carry out recording smoothly even in an environment of particularly high humidity (30° C. 85% RH).

When the sheet material 7 was used in the recording system A, scattering of toner and faulty transfer of toner occurred, and favorable images could not be obtained. In addition, when the sheet material 7 was used in the test methods B–E, high-quality images could not be obtained as was the case with the sheet material 6.

The recording media of the present invention having the above-described arrangement has the following characteristics:

(1) Suitability for electrostatic recording:

The surface has excellent heat resistance, and has no such problem as the surface becoming white turbid after the toner has been fixed thermally, so that it is possible to obtain images with excellent light transmittance.

It is possible to obtain high-quality images which excel in adhesion of toner and are free of a blushing phenomenon resulting from electrostatic charging or the like.

(2) Suitability for recording with recording instruments and recording apparatus using water-based media:

It is possible to obtain clear and high-quality light-transmissive color images excellent in adhesion of a recording agent.

In a system of directly contacting and recording on the surface, such as one using felt-tip pens, fluorescent markers, and fountain pens, a recording section is capable of maintaining the configuration of the recording medium during recording, and damage to images does not occur even if writing is effected on a pile of sheets.

Furthermore, the recording media of the present invention provide high-quality and clear images when a recording apparatus using the heat transfer system or impact-type recording system are employed.

In particular, the recording media of the present invention has excellent suitability for heat transfer recording, and displays the following features:

During recording, the recording media and recorded images are not liable to deformation or damage caused by heat.

The transferability of ink wax and the adhesion of the transferred ink wax are excellent.

As described above, the recording media of the present invention are capable of providing excellent light-transmissive recording images even in recording systems employing electrostatic recording, such as electrophotographic copying machines, and in recording systems requiring heating, such as the heat transfer system. At the same time, the recording media of the invention also provides excellent light-transmissive recorded images even in recording systems using water-based recording media, such as water-based writing instruments, pen plotters, and ink-jet recording and have hitherto been unavailable.

We claim:

1. A light-transmissive recording medium, comprising a coating layer which contains a modified product of a water-soluble polymer having been made water-insoluble and has a surface electric resistance of not more than $10^{14}\Omega/cm^2$, and has a water resisting property and a property of trapping a recording agent which is soluble and/or dispersible in a water-based medium.

2. A light-transmissive recording medium according to claim 1, wherein said surface electric resistance is in the range of $10^8$–$10^{14}\Omega/cm^2$.

3. A light-transmissiva recording medium according to claim 1, wherein said surface electric resistance is in the range of $10^{10}$–$10^{14}\Omega/cm^2$.

4. A light-transmissive recording medium according to claim 1, wherein said coating layer has a property of absorbing said water-based medium.

5. A light-transmissive recording medium according to claim 1, wherein the linear light transmittance of the medium is 10% or above.

6. A light-transmissive recording medium according to claim 1, wherein the linear light transmittance of the medium is 30% or above.

7. A light-transmissive recording medium according to claim 1, wherein the heat softening temperature of said surface of said coating layer is 100° C. or above.

8. A light-transmissive recording medium, comprising a coating layer which contains a modified product of a water-soluble polymer having been made water-insoluble and has a surface electric resistance of not more than $10^{14}\Omega/cm^2$, and has a water resisting property and a property of trapping a recording agent which is soluble and/or dispersible in a water-based medium even under a wet condition.

9. A light-transmissive recording medium according to claim 8, wherein said surface electric resistance is in the range of $10^8$–$10^{14}\Omega/cm^2$.

10. A light-transmissive recording medium according to claim 8, wherein said surface electric resistance is in the range of $10^{10}$–$10^{14}\Omega/cm^2$.

11. A light-transmissive recording medium according to claim 8, wherein said coating layer has a property of absorbing said water-based medium.

12. A light-transmissive recording medium according to claim 8, wherein the linear light transmittance of the medium is 10% or above.

13. A light-transmissive recording medium according to claim 8, wherein the linear light transmittance of the medium is 30% or above.

14. A light-transmissive recording medium according to claim 8, wherein the heat softening temperature of said surface of said coating layer is 100° C. or above.

15. A light-transmissive recording medium according to claim 8, wherein said coating layer has water resistance in the range of pH 4–10.

16. A light-transmissive recording medium according to claim 8, the wet fastness to rubbing of said coating layer according to JIS-L-0853 is Class 2 or above.

17. A light-transmissive recording medium according to claim 8, wherein said coating layer includes a cationic modified product of polyvinyl alcohol, and a crosslinking compound.

18. A light-transmissive recording medium according to claim 1, wherein said coating layer is nonporous.

19. A light-transmissive recording medium according to claim 8, wherein said coating layer is nonporous.

20. A method of image formation, comprising effecting image formation on the light-transmissive recording medium of claim 1 using any of recording systems including an electrostatic recording system, a recording system using a water-based ink pen, a thermal transfer recording system, and an ink-jet recording system.

21. A method of image formation according to claim 20, wherein said surface electric resistance of said recording medium is in the range of $10^8$–$10^{14}\Omega/cm^2$.

22. A method of image formation according to claim 20, wherein said surface electric resistance of said recording medium is in the range of $10^{10}$–$10^{14}\Omega/cm^2$.

23. A method of image formation according to claim 20, wherein said coating layer of said recording medium has a property of absorbing said aqueous medium.

24. A method of image formation according to claim 20, wherein said coating layer of said recording medium is nonporous.

25. A method of image formation according to claim 20, wherein the heat softening temperature of said surface of said recording medium is 100° C. or above.

26. A method of image formation according to claim 20, wherein said coating layer of said recording medium is water-resistant.

27. A method of image formation according to claim 20, wherein said coating layer of said recording medium has water resistance in the range of pH 4–10.

28. A method of image formation according to claim 20, wherein the wet fastness against rubbing of said coating layer of said recording medium according to JIS-L-0853 is Class 2 or above.

29. A method of image formation according to claim 20, wherein said coating layer of said recording medium includes a cationic modified product of polyvinyl alcohol and a crosslinking compound.

30. A light-transmissive recording medium according to claim 17, wherein the mixing ratio of said cationic modified polyvinyl alcohol to said crosslinking compound ranges from 100/1 to 2/1.

* * * * *

UNITED STATES PATENT AND TRADEMARK OFFICE

CERTIFICATE OF CORRECTION

PATENT NO. : 4,783,376

DATED : November 8, 1988

INVENTOR(S) : MAMORU SAKAKI, ET AL.

It is certified that error appears in the above-identified patent and that said Letters Patent is hereby corrected as shown below:

IN [56] REFERENCES CITED

U.S. PATENT DOCUMENTS, "Matsufugi" should read --Matsufuji--.

Assistant Examiner, "P.J. Ryon" should read --P.J. Ryan--.

COLUMN 2

Line 31, "an" should read --a--.

COLUMN 3

Line 8, "trapping" (first occurrence) should be deleted.
Line 9, "agent is" should read --agent which is--.
Line 27, "waterbased" should read --water-based--.

COLUMN 4

Line 28, "perferably" should read --preferably--.
Line 31, "whbse" should read --whose--.
Line 57, "a.heating" should read --a heating--.

COLUMN 5

Line 38, "an" should read --a--.

UNITED STATES PATENT AND TRADEMARK OFFICE
CERTIFICATE OF CORRECTION

PATENT NO. : 4,783,376

DATED : November 8, 1988

INVENTOR(S) : MAMORU SAKAKI, ET AL.

It is certified that error appears in the above-identified patent and that said Letters Patent is hereby corrected as shown below:

COLUMN 6

Line 37, "slats" should read --salts--.
Line 55, "troderivatives" should read --tro-derivatives--.
Line 56, "p-aminostyerne," should read --p-aminostyrene,--.

COLUMN 7

Line 30, "filmforming" should read --film-forming--.

COLUMN 8

Line 30, "inkabsorbing" should read --ink-absorbing--.
Line 33, "theink-jet" should read --the ink-jet--.

COLUMN 9

Line 40, "light-transm:issive" should read --light-transmissive--.
Line 49, "an" should read --a--.

COLUMN 12

Line 17, "th" should read --the--.
Line 19, "composition was" should read --compositions were--.

UNITED STATES PATENT AND TRADEMARK OFFICE

CERTIFICATE OF CORRECTION

PATENT NO. : 4,783,376

DATED : November 8, 1988

INVENTOR(S) : MAMORU SAKAKI, ET AL.

It is certified that error appears in the above-identified patent and that said Letters Patent is hereby corrected as shown below:

COLUMN 13

Line 25, "scraches" should read --scratches--.
Line 33, "a" (second occurrence) should read --an--.
Line 37, "present" should read --presence--.
Line 41, "either item," should read --either item with a triangle,--.

COLUMN 14

Line 14, "Ltd.) spectral" should read --Ltd.). Spectral--.
Line 29, "bredth" should read --breadth--.

COLUMN 16

Line 29, "light-transmissiva" should read --light-transmissive--.

UNITED STATES PATENT AND TRADEMARK OFFICE

CERTIFICATE OF CORRECTION

PATENT NO. : 4,783,376

DATED : November 8, 1988

INVENTOR(S) : MAMORU SAKAKI, ET AL.

It is certified that error appears in the above-identified patent and that said Letters Patent is hereby corrected as shown below:

COLUMN 17

Line 9, "claim 8, the" should read --claim 8, wherein the--.

Signed and Sealed this

Thirty-first Day of October, 1989

*Attest:*

DONALD J. QUIGG

*Attesting Officer*

*Commissioner of Patents and Trademarks*